(12) United States Patent
Painter

(10) Patent No.: US 9,453,302 B2
(45) Date of Patent: Sep. 27, 2016

(54) WOOD FIBRE ACETYLATION

(75) Inventor: Benjamin Painter, Gaffney, SC (US)

(73) Assignee: Titan Wood Limited, Windsor (GB)

( * ) Notice: Subject to any disclaimer, the term of this patent is extended or adjusted under 35 U.S.C. 154(b) by 0 days.

(21) Appl. No.: 14/123,958

(22) PCT Filed: Jun. 8, 2012

(86) PCT No.: PCT/EP2012/060925
§ 371 (c)(1),
(2), (4) Date: Feb. 4, 2014

(87) PCT Pub. No.: WO2012/168446
PCT Pub. Date: Dec. 13, 2012

(65) Prior Publication Data
US 2014/0311693 A1    Oct. 23, 2014

Related U.S. Application Data

(60) Provisional application No. 61/495,515, filed on Jun. 10, 2011.

(51) Int. Cl.
| | |
|---|---|
| *B27K 3/02* | (2006.01) |
| *B27K 3/08* | (2006.01) |
| *C08H 8/00* | (2010.01) |
| *D21C 9/00* | (2006.01) |
| *D21B 1/02* | (2006.01) |

(52) U.S. Cl.
CPC ........... *D21B 1/021* (2013.01); *B27K 3/02* (2013.01); *B27K 3/08* (2013.01); *C08H 8/00* (2013.01); *D21C 9/005* (2013.01)

(58) Field of Classification Search
CPC ........ D21C 9/005; D21C 9/002; C08H 8/00; D21B 1/02; B27K 3/08; B27K 3/02
USPC .................................................. 162/76, 234
See application file for complete search history.

(56) References Cited

U.S. PATENT DOCUMENTS

| | | | | |
|---|---|---|---|---|
| 6,364,999 B1 * | 4/2002 | Speaks et al. | ................... | 162/25 |
| 2009/0043088 A1 * | 2/2009 | Shimamoto | ............... | C08B 3/00 536/58 |
| 2013/0303751 A1 * | 11/2013 | Rowell | .................... | D21B 1/06 536/120 |
| 2016/0002415 A1 * | 1/2016 | Beardmore | .............. | B27N 3/04 162/157.6 |

FOREIGN PATENT DOCUMENTS

| | | |
|---|---|---|
| CN | 1104218 A | 6/1995 |
| GB | 1001750 | 8/1965 |
| GB | 1001750.7 | 2/2010 |
| WO | 95/23055 A1 | 8/1995 |
| WO | 98/01497 A1 | 1/1998 |
| WO | 2005077626 A1 | 8/2005 |
| WO | 2011095824 A1 | 8/2011 |

OTHER PUBLICATIONS

Zhao et al., Single-Stage Pulping of Sugarcane Bagasse with Peracetic Acid, 2011, Journal of Wood Chemistry and Technology, 31, pp. 1-25.*
International Search Report (mailing date Aug. 10, 2012) for PCT/EP2012/060925, filed Jun. 8, 2012.

* cited by examiner

*Primary Examiner* — Anthony Calandra
(74) *Attorney, Agent, or Firm* — Innovation Capital Law Group, LLP; Vic Lin

(57) ABSTRACT

Disclosed is a modified refiner system for the acetylation of wood chip and/or wood fiber. The invention comprises a process for the acetylation of wood chip in a refiner system including a feed hopper component, a non-steam digester component and a refiner (defibrator) component in which the chip is contacted with an acetylating fluid between the hopper and the digester components within a connecting multi-zone compression feed screw.

16 Claims, No Drawings

WOOD FIBRE ACETYLATION

The present invention relates to processes for the preparation of acetylated wood fibre, and in particular soft wood fibre, suitable as a feed-stock in the manufacture of medium and high density fibre board or panel possessing unique and highly desirable properties. The description "fibre board" includes "particle board" products.

Traditionally, wood fibre used in the manufacture of medium and high density fibre board has been prepared from wood chip derived primarily from soft wood starting materials such as pine or spruce. Such chip is converted to fibre by passing through a so-called refiner system which consists essentially of a chip hopper (storage) component, a digester component and a refiner (defibrator) component, in which chip is conveyed from hopper to digester and from digester to refiner by suitable feed screw means. In the digester the chip is softened by exposure to steam and fed to the refiner which grinds the chip to fibre before it is blown into a conventional flue gas drier. Composite wood fibre board or panel made from such wood fibre is used in a vast range of industries, but it has limited application in conditions where it may be exposed to moisture. In such cases the board is subject to swelling and subsequent loss of strength, and bacterial and fungal degradation.

Using acetylated materials in the manufacture of fibre board is known to mitigate the adverse effects of moisture, but hitherto the production of such materials has not been successfully achieved on a commercial scale.

The present invention seeks to meet this serious limitation.

Thus, the present invention aims to modify a commercial refiner system for the acetylation of the wood chip and/or wood fibre, and thereby to advantageously influence the properties of fibre board subsequently made from acetylated wood fibre.

Accordingly, in a first embodiment the present invention comprises a process for the acetylation of wood chip in a refiner system including a feed hopper component, a non-steam digester component and a refiner (defibrator) component in which the chip is contacted with an acetylating fluid between the hopper and the digester components within a connecting multi-zone compression feed screw.

The term chip is used here to indicate the type of wood element, and includes the plural form, as will normally be the practice of manufacture.

Preferably, the connecting feed screw comprises a three pressure zone feed screw for admitting the acetylation fluid, desirably comprising a first compression zone, a second zone where the pressure is released and acetylating fluid is admitted and a third compression zone.

In a second embodiment the present invention comprises a process according to the first embodiment in which acetylating fluid is additionally admitted to the digester component to increase the final degree of wood acetylation.

In a third embodiment the present invention comprises a process according to the first and second embodiments in which acetylating fluid is additionally admitted between the digester and refiner (defibrator) components via a connecting feed screw to further enhance the final level of wood acetylation.

Thus, it is possible to acetylate wood chip and/or wood fibre within a commercial refiner system to provide acetylated wood fibre feedstock for fibre board of superior, and highly desirable properties.

Preferably, wood chip (typically approximately 50 mm×25 mm×10 mm in size) to be acetylated and refined according to the present invention is first dried, e.g. by hot air, to a moisture content of 0.5% to 6% moisture, preferably 2% to 4%, more preferably 2.5% to 3.5%, and supplied to a feed hopper.

The three pressure zone feed screw mechanism by which dried wood chip is conveyed from the feed hopper to the digester provides a first light compression zone, e.g. 1.1-1.2 to 1 at ambient temperature. A second zone where the pressure is released to atmospheric and acetylating fluid is introduced, e.g. via a hollow screw barrel, comprising typically a mixture by volume of acetic anhydride (90%) and acetic acid (10%) at a temperature of 85 C-135 C, and a third compression zone which applies a moderate pressure to the wet chip, e.g. 1.3-1.4 to 1 at the equilibrium temperature. The temperature of the wood chip mass is further increased by exothermic reactions between the acetylating fluid and residual water, and the acetylating fluid and the chip. In the case of a typical soft wood chip, the degree of acetylation on leaving the pressure zone feed screw, depending on residence time, could be expected to be of the order of 4-6 weight % gain. Wood chip introduced to the multi-zone compression feed screw is first mixed with an inert gas (to exclude air) at ambient temperature, e.g. nitrogen or flue gas.

In the second embodiment of the invention partially acetylated wood chip on entering the digester component (from the third zone of the compression screw) is further exposed to an acetylating fluid (e.g. 90/10 acetic anhydride/acetic acid mixture by weight) introduced at the top of the generally columnar digester, at a temperature in the range of 145-170° C., and under a pressure of 3-4 bar. Chip residence time in the digester is typically 3-8 minutes. In this process steam is not introduced into the digester as it would be in a conventional refiner system. On its discharge from the digester the wood chip would, typically, have an acetyl content (by weight gain) of 16-19%.

Acetylated wood chip is conveyed from the digester to the refiner (defibrator) component of the system by a typical feed screw where it is converted to fibre.

In the third embodiment of the invention, acetylation fluid is also introduced via the feed screw to the refiner (defibrator) component comprising, for example, a stationary/rotating double disc refiner. Typically, the fluid comprises a mixture by volume of 35-60% acetic anhydride and 65-40% acetic acid at ambient temperature and pressure, thus exposing the wood chip/freshly created wood fibre to further acetylation, typically reaching 19-20 weight % gain.

As the wood fibre will be ejected at high speed from the refiner plates, it may be preferable to collect the material by way of a cyclone to reduce its velocity before forwarding to a conventional drier, e.g. tray drier. Further fibre acetylation may also occur at this late stage increasing a typical final level of acetylation to 21-23 weight % gain.

A clear advantage of acetylating in the refiner (defibrator) component is the greater reactive surface area of wood that is exposed for acetylation.

The acetylating fluid may comprise mixtures (by weight) of 30% to 95% acetic anhydride and 70% to 5% acetic acid.

The invention also pertains to a refiner system for defibrating wood chip, the system comprising a feed hopper component, a non-steam digester component and a refiner (defibrator) component, the system comprising a multi-zone compression feed screw connecting the feed hopper and the digester. Preferably, in this refiner system the connecting feed screw comprises a three pressure zone feed screw.

EXAMPLE 1

Spruce wood chip (approximately 50 mm×25 mm×10 mm in size) dried (by hot air) to a moisture content of approximately 3.5% by weight was mixed with nitrogen gas and fed continuously from a hopper through a three pressure zone feed screw to the digester component in a refiner system. In the first zone of the feed screw, the chip was slightly compressed to 1.15 to 1.00 of its volume before passing through a second zone where the pressure was released to atmospheric and a mixture of acetic anhydride (90%) and acetic acid (10%) at a temperature of 100 C was introduced through the hollow barrel of the feed screw. In the third zone moderate pressure was applied to the chip reducing its volume by 1.4 to 1.0. On entering the digester, suitably modified by removing its thermal jacket and closing the steam entry valve so that no steam entered the digester during the process, the chip was further contacted with a 90/10 mixture of acetic anhydride and acetic acid at a temperature of approximately 150° C. for approximately five minutes under a pressure of 3 bar, before being fed by a connecting, hollow feed screw to the refiner (defibrator) component of the refiner system. Further acetylation fluid was introduced via this feed screw consisting of a mixture of acetic anhydride 60% and acetic acid 40% at ambient temperature and pressure. Acetylated wood fibre ejected from the refiner plates was slowed and dried by conventional means. The degree of wood acetylation was found to be of the order of 21 weight % gain.

EXAMPLE 2

In this example, Example 1 was repeated using Radiata pine wood chip, approximately 45 mm×45 mm×8 mm in size. Similar processing conditions were applied to those used in Example 1 with the following exceptions. The moisture content of the chip was approximately 2.5%, the temperature of the 90/10 mixture of acetic anhydride and acetic acid in the digester was 165° C. with a chip residence time of approximately eight minutes under a pressure of 4 bar, and the acetic anhydride/acetic acid mixture introduced via the feed screw connecting the digester and refiner components was 35/65. The final degree of acetylation of the wood fibre was of the order of 23 weight % gain.

Acetylated wood fibre according to the present invention may readily be exploited in the manufacture of composite wood fibre board or panel, e.g. MDF or HDF, which manifest vastly superior properties such as strength and durability, when exposed to moisture, compared with similar products made from unacetylated wood fibres.

The invention claimed is:
1. A process for the acetylation of wood chip in a refiner system including a feed hopper component, a non-steam digester component and a refiner (defibrator) component, the process comprising contacting the chip with an acetylating fluid between the hopper and the non-steam digester components within a connecting multi-zone compression feed screw, wherein the acetylating fluid includes acetic acid and acetic anhydride.

2. A process according to claim 1, wherein the connecting multi-zone compression feed screw comprises a three pressure zone feed screw for admitting the acetylation fluid.

3. A process according to claim 2, wherein the three pressure zone feed screw comprises a first compression zone, a second zone where the pressure is released and acetylating fluid is admitted and a third compression zone.

4. A process according to anyone of the preceding claims, wherein acetylating fluid is additionally admitted to the non-steam digester component.

5. A process according to claim 1, wherein acetylating fluid is additionally admitted between the non-steam digester and refiner (defibrator) components via a connecting feed screw.

6. A process according to claim 1, wherein the wood chip is dried to a moisture content of 0.5% to 6% moisture, prior to being supplied to the feed hopper.

7. A process according to claim 6, wherein the moisture content is 2% to 4%.

8. A process for the acetylation of wood chip in a refiner system including a feed hopper component, a non-steam digester component and a refiner (defibrator) component, the process comprising contacting the wood chip with an acetylating fluid between the hopper and the non-steam digester components within a connecting multi-zone compression feed screw, wherein, on discharge from the multi-zone compression feed screw, the wood chip has an acetyl content, by weight gain, of 4 to 6 percent.

9. The process according to claim 8, wherein the connecting multi-zone compression feed screw comprises a three pressure zone feed screw for admitting the acetylation fluid.

10. The process according to claim 9, wherein the three pressure zone feed screw comprises a first compression zone, a second zone where the pressure is released and acetylating fluid is admitted and a third compression zone.

11. The process according to claim 8, wherein acetylating fluid is additionally admitted to the non-steam digester component.

12. The process according to claim 11, wherein, on discharge from the non-steam digester component, the wood chip has an acetyl content, by weight gain, of 16 to 19 percent.

13. The process according to claim 8, wherein acetylating fluid is additionally admitted between the non-steam digester and refiner (defibrator) components via a connecting feed screw.

14. The process according to claim 13, wherein, on discharge from the refiner (defibrator) component, the wood chip has an acetyl content, by weight gain, of 19 to 20 percent.

15. The process according to claim 8, wherein the wood chip is dried to a moisture content of 0.5% to 6% moisture, prior to being supplied to the feed hopper.

16. The process according to claim 15, wherein the moisture content is 2% to 4%.

* * * * *